Oct. 4, 1927.

V. Z. POST

ROTARY INTERNAL COMBUSTION ENGINE

Filed Jan. 21, 1921 6 Sheets-Sheet 3

1,644,490

INVENTOR
Van Zo Post
BY
Pundle, Wright and Small,
ATTORNEYS

Oct. 4, 1927.

V. Z. POST

1,644,490

ROTARY INTERNAL COMBUSTION ENGINE

Filed Jan. 21, 1921   6 Sheets-Sheet 4

INVENTOR
*Van Zo Post*
BY
ATTORNEYS

Oct. 4, 1927.

V. Z. POST 1,644,490

ROTARY INTERNAL COMBUSTION ENGINE

Filed Jan. 21, 1921    6 Sheets-Sheet 6

INVENTOR
Van Zo Post
BY
Prindle, Wright and Sall,
ATTORNEYS

Patented Oct. 4, 1927.

1,644,490

UNITED STATES PATENT OFFICE.

VAN ZO POST, OF NEW YORK, N. Y.

ROTARY INTERNAL-COMBUSTION ENGINE.

Application filed January 21, 1921. Serial No. 438,827.

My invention relates to a rotary internal combustion engine and has for its object to provide an efficient engine with few moving parts which can be stamped from sheet metal and assembled quickly and accurately.

A further object of my invention is to provide a cylindrical rotor turning freely within a non-circular stator.

A further object of my invention is to provide radially moving rotor blades provided with friction rollers.

A further object of my invention is to provide simple means for taking up wear at all points.

A further object of my invention is to provide radially moving rotor blades divided transversely and morticed together to enclose springs tending to force the segments of the blades apart to take up end wear and preserve a gas-tight joint.

A further object of my invention is to provide a stator with its center cut away to permit the entrance and exit of a cooling medium into and from the interior of the engine.

A further object of my invention is to provide a hollow rotor having openings near the center so that a cooling fluid may circulate freely therein, particularly against the periphery of the rotor.

A further object of my invention is to provide a circular opening entirely through the engine concentric with the main shaft, with arms on the ends of the stator to support the shaft bearings and with radial blades inclined to form exhaust fans on the rotor to connect the rotor to the main shaft.

A further object of my invention is to provide a gas-tight packing between two plane surfaces, one or both rotating around a common axis at different speeds in the same direction or at the same or different speeds in opposite directions.

A further object of my invention is to provide a stator with recesses provided with ports registering with ports in the rotor and leading to the intake and to the exhaust.

A further object of my invention is to provide a compression reservoir adapted to store a fuel or a gas mixture (or air while engine is being operated as a Diesel) at a predetermined constant pressure and capable easily of adjusting the amount of the constant pressure charge, thereby adapting the engine for use with fuels of varying densities.

A further object of my invention is to provide a fuel inlet control which enables the engine to be operated at all altitudes without loss in efficiency.

A further object of my invention is to provide a rotor formed in sections along a line parallel with the axis thereof so that one section may be withdrawn from the engine after removing the end of the stator to give access to the interior of the remainder of the rotor.

A further object of my invention is to provide a rotor formed substantially of sections along a line parallel with the axis thereof so that one section may be withdrawn from the engine after removing the end of the stator to give access to the interior of the remainder of the rotor in which is mounted the blades and preferably pipes connecting with a hollow drive shaft for distributing lubricating oil.

A further object of my invention is to provide a pressure reservoir built in sections with a valve and operating mechanism therefor carried on one of said sections.

A further object of my invention is to force oil under pressure into the hollow drive shaft from which oil pipes lead through the interior of the rotor to certain bearing points.

A further object of my invention is to provide gas checks between the rotor and stator to prevent the escape of gases from the working chamber.

Other and further objects of my invention will be apparent from the following description and from the accompanying drawings, in which.

Similar reference characters refer to similar parts throughout the drawings.

In the embodiment of my invention chosen for purposes of illustration, twin stators are shown, preferably drum shaped, and each with its periphery formed of two approximately elliptical or non-circular curves. Each stator has therein a cylindrical rotor connected to the main drive shaft, thus forming two chambers between the non-circular stator and circular rotor. Each rotor in this embodiment is provided with two radially moving blades 180° apart maintained in contact with the elliptical or non-circular periphery of its respective stator by expansion springs. A suitable compression reservoir is shown between the two stators.

Figure 12:
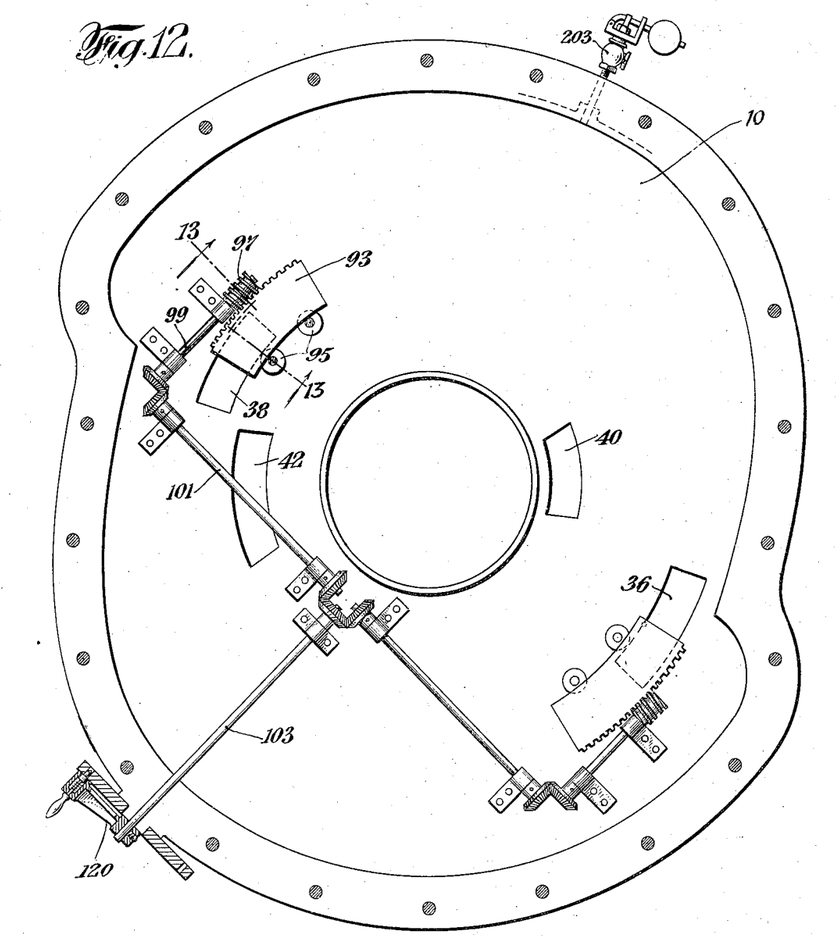
Figure 12 a vertical section on an enlarged scale of the inside of the compression reservoir taken on line 12—12 of Figure 1 looking in the direction of the arrows.

In the said embodiment, the stators are illustrated as having their peripheries form by non-circular bands 1 and 2 each of which is provided with outer flanges 3 and 4 respectively and with similar inner flanges 5 and 6 respectively. The outer ends of the stators are closed by end plates 7 and 8 respectively, bolted or otherwise secured to outer flanges 3 and 4 respectively of said bands 1 and 2 with gaskets 200 between the two parts to permit them to be brought nearer together to take up wear. The end plates 7 and 8 each are provided with a central opening having arms 23 and 24 respectively which support the main drive shaft bearings. The inner ends of the stators are closed by the compression reservoir 202 which preferably is formed of two sections 9 and 10 having respectively flanges 11 and 12 bolted or otherwise secured together, preferably between said inner flanges 5 and 6. Gaskets 201 are provided between the two flanges 11 and 12 to provide for taking up wear. A safety valve 203 (Figure 12) of any desired type may be provided for the compression reservoir adapted to be set to blow off at the maximum pressure to which the fuel, as for example a mixture of gas and air, may be compressed with safety.

To the outside of end plates 7 and 8 respectively are riveted, hot welded, or otherwise secured, circular plates 13 and 14 having circular grooves which cooperate with corresponding grooves in ends 7 and 8 to form circular recesses 15 and 17, and 16 and 18, respectively. Recesses 15 and 16 are exhaust recesses having pipes 19 and 20 respectively leading therefrom, and chambers 17 and 18 are intake recesses having respectively pipes 21 and 22 leading thereto and which may be connected with a carbureter or with any desired source of supply according to the type of engine.

Figure 5:
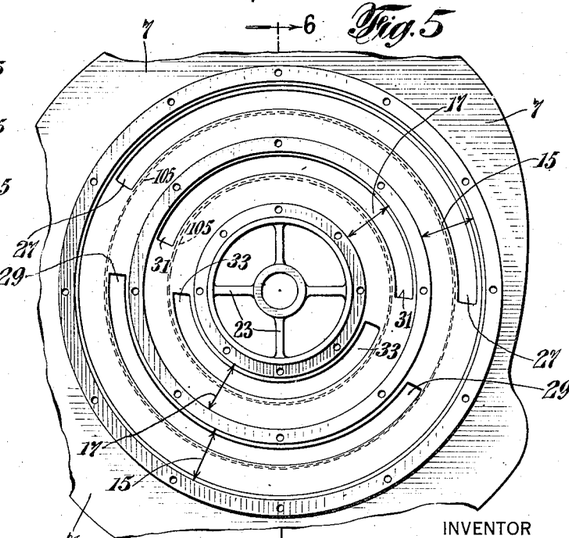
Figure 5 a fragmentary end view of the stator end on reduced scale taken on the line 5—5 of Figure 1 looking in the direction of the arrows and showing the interior of the ingress and egress recesses.

End plate 7 is provided (Figure 5) with circular ports 27, 29, 31, and 33. Ports 27 and 29 open into exhaust recess 15, and ports 31 and 33 open into intake recess 17. End plate 8 is provided with similar ports similarly placed with respect to exhaust and inlet recesses 16 and 18 respectively.

Figure 11:
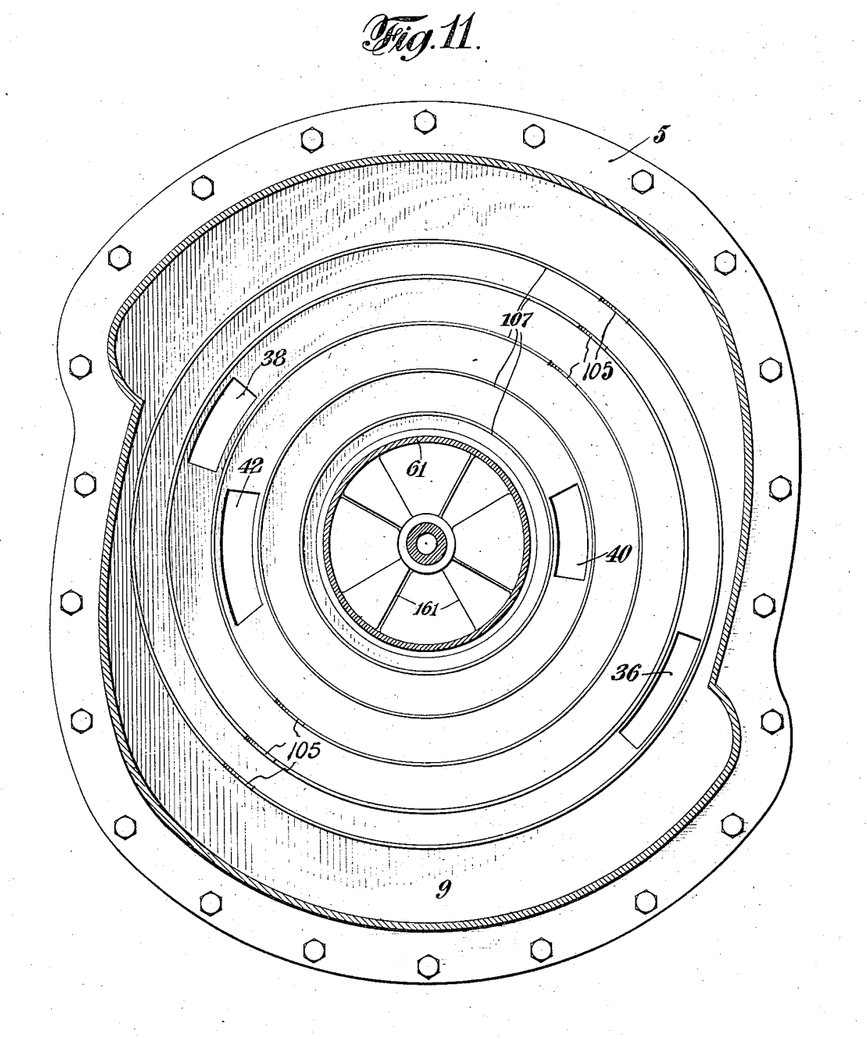
Figure 11 a vertical section on an enlarged scale of the outside of the compression reservoir taken on line 11—11 of Figure 1 looking in the direction of the arrows.

The vertical side 9 of compression reservoir 202 is provided (Figure 11) with ports 36, 38, 40, and 42. Ports 36 and 38 are for the emission of the compressed mixture (or of the air or other gas as the case may be) from the compression reservoir, and ports 40 and 42 are for the entrance of the mixture (or of the air or other fuel as the case may be) into the compression reservoir. Vertical side 10 of the compression reservoir is provided with similar ports similarly placed.

At the two points of greatest space between stator 1 and its corresponding rotor (Figure 2) are provided spark plugs 43 and 45 for the explosion of an explosive mixture. If it is desired to operate the engine on the Diesel principle, injectors 47 and 49 may be utilized. If desired the periphery of the stator may be reinforced in any desired manner at the point where the explosion takes place as by welding or riveting extra plates thereto.

Figure 1:
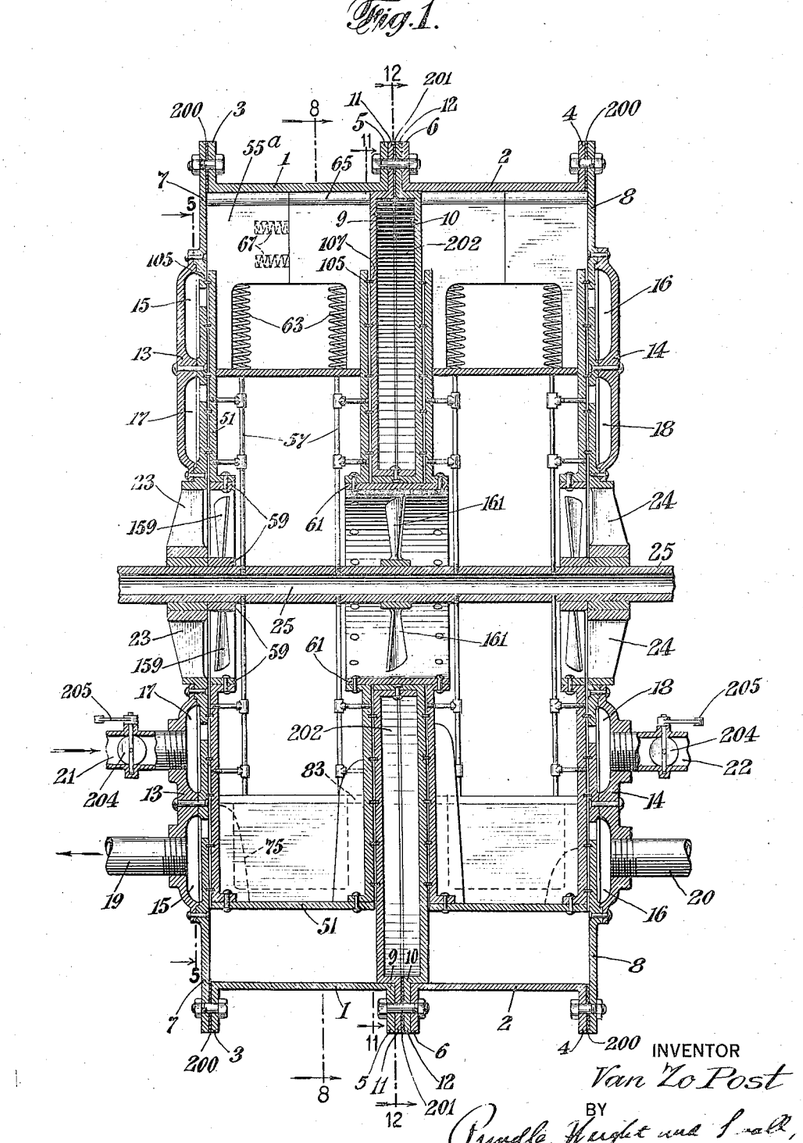
Figure 1 is a vertical section taken through the stator and the main shaft and showing part of rotor remaining after removing the right part of same on line indicated by line 53 of Figure 2, with blade sheaths broken away above to show rotor blades, and with blade sheaths and rotor blades removed below.

As stated above, a twin rotor is shown on each side of the compression reservoir. One rotor is between end plate 7 and portion 9 of the compression reservoir and the other between end plate 8 and portion 10 of the compression reservoir. These rotors preferably are cylindrical, turn in the same direction, and are built of sheet steel pressed into shape and riveted or hot welded. Each rotor preferably is made in two sections. In rotor 51, the line 53 (Figure 2) indicates one method of division in which one portion will carry the blades 55$^a$ and 55$^b$ and oil pipes 57 (Figure 1). The rotors are bolted or otherwise secured to an end wheel 59 and a middle wheel 61 which are secured to main shaft 25 in any desired manner as by keys. The spokes 159 and 161 respectively of said wheels may be formed to operate as exhaust fans for removing air or to permit the introduction of water. The sectional construction of each rotor renders it easy to inspect and repair. After removing the end plate 7, the smaller section of the rotor on that side of the compression reservoir may be removed, thereby leaving exposed the larger section of the rotor having therein blades 55$^a$ and 55$^b$ and oil pipes 57 which thus are rendered accessible for inspection or repair.

Figures 8, 9, 10:
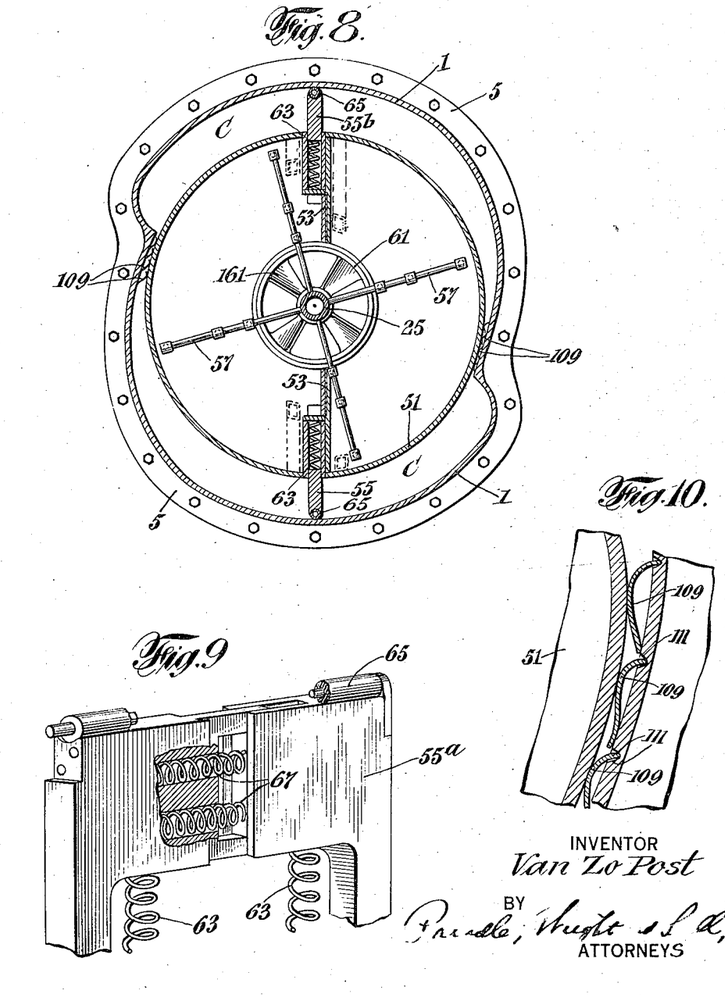
Figure 8 a vertical section on reduced scale taken on line 8—8 of Figure 1 looking in the direction of arrows.
Figure 9 a fragmentary enlarged perspective of one of the rotor blades.
Figure 10 a detailed enlarged section of rotor and stator showing the spring packing.

Each blade 55$^a$ and 55$^b$ of the rotors is forced outwardly by springs 63 and preferably is provided at its top with a friction roller 65. In order to provide a tight fit and to take up end wear, each blade (Figure 9) preferably is divided transversely, morticed together, and provided with transversely expanding springs 67 tending to force the segments apart.

Figure 2:
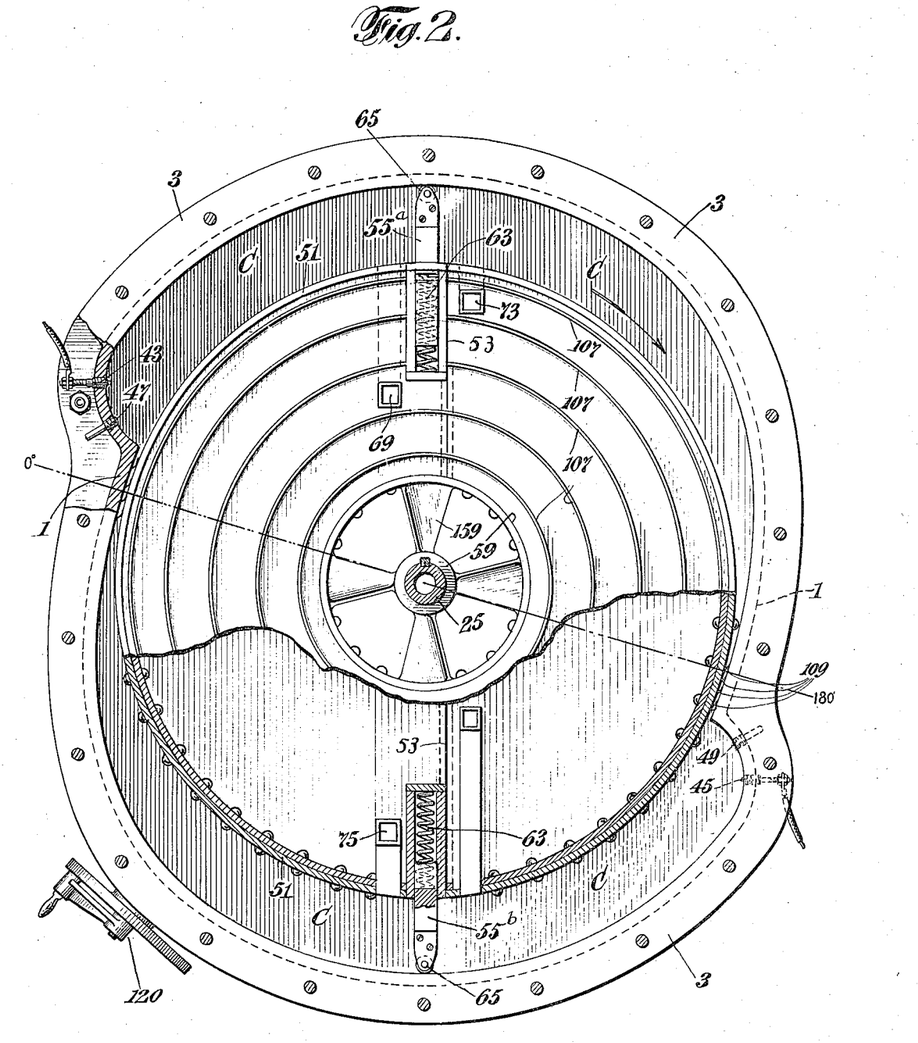
Figure 2 a view looking from the left of Figure 1 with end plate 7 removed and with the lower part of the rotor cut away.
Figure 3:
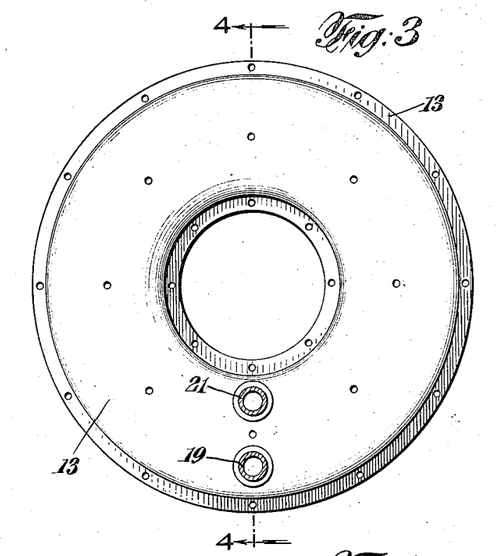
Figure 3 a detached end view on reduced scale looking from the left of Figure 1 of the outside circular plate attached to the stator end to from therewith ingress and egress recesses.
Figure 4:
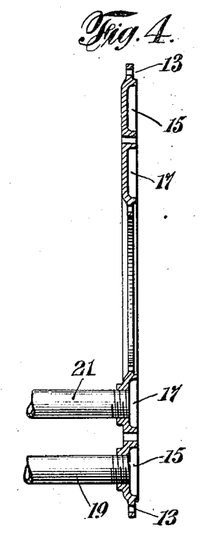
Figure 4 a vertical section taken on line 4—4 of Figure 3 looking in the direction of the arrows.
Figure 7:
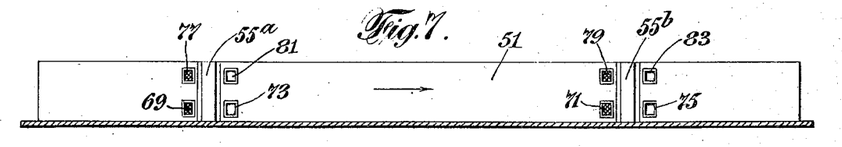
Figure 7 a fragmentary development of the surface of the rotor shown in Figure 2 and showing surface ports and radial blades.

Each rotor is provided (Figure 7) with two sets of four adjacent conduits 69, 73, 77, and 81; and 71, 75, 79, and 83. One end of each conduit opens on the periphery of the rotor and the other end on one of the two flat sides of the rotor. The peripheral opening of each conduit 69 and 71 preferably is adjacent and behind a blade 55$^a$ and 55$^b$ respectively and near the outer edge of the rotor adjacent the stator end 7. Each of said conduits 69 and 71 is adapted to register respectively with inlet ports 31 and 33 in the stator end 7 (Figure 5) and to convey the mixture (or other fuel) from inlet recess 17 (Figure 1) to the working chamber C (Figure 2) between the periphery of each rotor and its stator. The peripheral opening of each conduit 73 and 75 preferably is adjacent and in front of a blade 55$^a$ and 55$^b$ respectively and also near the outer edge of the rotor adjacent the stator end 7. Each of said conduits 73 and 75 is adapted to register respectively with exhaust ports 27 and 29 in the stator end 7 (Figure 5) and to convey the exploded gases from working chamber C (Figure 2) to exhaust recess 15 (Figure 1). The peripheral opening of each conduit 77 and 79 preferably is adjacent and behind a blade 55$^a$ and 55$^b$ respectively and near the inner edge of the rotor adjacent the compression reservoir. Each of said conduits 77 and 79 is adapted to register respectively with exit ports 38 and 36 from the compression reservoir (Figure 11) and to convey the mixture (or other fuel) from the compression reservoir to the working chamber C (Figure 2). The peripheral opening of each conduit 81 and 83 preferably is adjacent and in front of a blade 55$^a$ and 55$^b$ respectively and also near the inner edge of the rotor adjacent the compression reservoir. Each of said conduits 81 and 83 is adapted to register respectively with entrance ports 42 and 40 into the compression reservoir (Figure 11) and to convey the mixture (or other fuel) from the working chamber C (Figure 2) to the compression reservoir. The peripheral openings 69, 71, 77, and 79 which are located behind the blades 55$^a$ and 55$^b$ and therefore in contact with the explosion in the working chambers, preferably are covered with fire gauze for protective purposes. Similar openings for a similar purpose are provided on the other rotor. All openings may be provided with fire gauze if desired.

Figure 13:
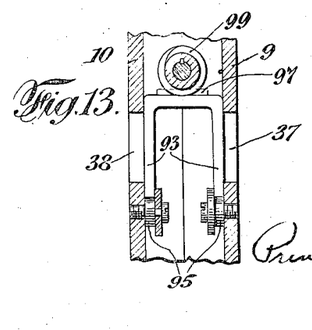
Figure 13 a vertical section taken on line 13—13 of Figure 12 looking in the direction of the arrows.

The exit ports 36 and 38 (Figure 11) and 36 and 38 (Figure 12) from the compression reservoir preferably are adjustable in degree of opening so as to vary the amount of mixture or air (as the case may be) fed to the working chamber. The pressure thus can be increased from atmospheric pressure by reducing the cut-off to whatever pressure the engine is designed to stand and therefore fuels of any density can be utilized at their maximum efficiency pressure. In the embodiment illustrated (Figures 12 and 13), the slide valve 93 for exit ports 37 and 38 preferably is U-shaped with its legs mounted on rollers 95 and its top provided with a rack adapted to be engaged by a worm 97 mounted on a stem 99 connected by bevel gears to a shaft 101 which in turn is connected by bevel gears to a common shaft 103 extending through the compression reservoir to a handle 120 on the outside thereof of any desired type, but preferably adapted to engage notches provided with designations to facilitate setting the valve at the point which has been determined experimentally gives the best results for the fuel used. The slide valve for exit ports 35 and 36 is similar to that described above for exit ports 37 and 38 and preferably is operated by the same handle 120 that operates slide valve 93 for ports 37 and 38. It is preferable that the operating parts for the valves be mounted only on one section of the compression chamber in order to facilitate overhauling and dismantling. Thus it is necessary only to remove the section of the chamber on which the parts are not mounted to expose them to easy access. The two leg construction of valve 93 adapts it for control of the corresponding ports 35, 36 and 37, 38 on each side (9 and 10) of the compression reservoir.

Figure 6:
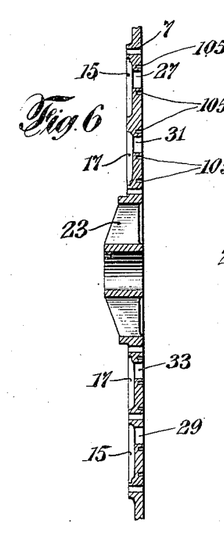
Figure 6 a vertical section taken on the line 6—6 of Figure 5 looking in the direction of the arrows.

In order to prevent the escape of gas or air between the rotor and end plate 7 on one side, and between the rotor and the compression reservoir on the other side and particularly between the different non-cooperating ports and conduits, the adjacent parts are provided with corresponding circular grooves 105 (Figures 1 and 6) in which are mounted spring hoops 107 (Figure 1) having their ends lapped and morticed, thus leaving the hoops free to expand radially from their own resilience. The hoops may be fastened to one of the parts or not as desired.

To prevent the escape of gas backward from the working chamber, a series of steel packing springs 109 (Figure 10) may be provided having one end set in sockets 111 so that they may be renewed easily when necessary.

In operation, as the shaft revolves the fuel or mixture or air (as the case may be) is drawn in behind each blade 55$^a$ and 55$^b$ of one rotor from pipe 21 to recess 17 and thence through ports 31 and 33 and through conduits 69 and 71 to working chamber C between the periphery of the rotor and its stator. At the same time the exploded gases from the previous explosion are forced from the front of the blades through the conduits 73 and 75 in the rotor and through ports 27 and 29 into recess 15 and pipe 19. As each blade enters the next chamber the exp'osive charge enters the chamber behind the blade, coming from the compression cylinder through its ports 36 and 38 into the conduits 77 and 79 of the rotor and into said working chamber C where it is exploded, thereby driving each blade forward, which at the same time forces before it the fresh gas previously drawn in by the other blade and drives the gas through ports 81 and 83 of the rotor into the compression cylinder through its ports 39 and 41 in the side thereof. Although in each rotor the same operation is performed at the same time with each of the blades, the two rotors preferably are so set relative to each other as to explode in sequence and not in unison. The compression in the compression reservoir is kept constant, thereby ensuring a uniform explosive effect, the extent of which can be varied by adjusting the opening of the ports 35 and 37 by their respective set valves (set valve 93 for port 37). It is apparent that an inlet opening such for example as inlet opening 21, if designed to build up and maintain a desired maximum pressure in compression reservoir 202 without wasteful use of safety valve 203 would be effective for that purpose only at a certain air pressure. If designed for air pressure at sea level, it would be insufficient in size to supply sufficient fuel for the lessened air pressure at high altitudes. On the other hand, if designed for air pressure at high altitudes, it would supply too much fuel for the increased air pressure at sea level and result in a wasteful blowing off at sea level of safety valve 203 in compression reservoir 202. In order to overcome this difficulty, said inlet opening 21 is designed of such size as to furnish sufficient fuel for the low air pressure of the highest altitudes desired and is provided with a throttle 204 having a control rod 205 of any desired type to diminish the fuel flow at the increased air pressure of lower altitudes.

It is impossible in the ordinary type of internal combustion engine to make the engine inlets large enough to enable the engine to develop its maximum efficiency at high altitudes. This is accomplished in the present embodiment in the manner described above, as said inlet opening 21 can be large enough to permit fuel to enter the compression chamber at high altitudes in sufficient quantities to maintain the desired efficiency pressure in the compression reservoir which feeds the combustion chamber with fuel at the desired efficiency pressure for the particular fuel used. At low altitudes said inlet opening 21 is reduced in effective operation by throttle 204 sufficiently to prevent such great pressure in compression reservoir 202 as to cause the wasteful operation of safety valve 203 and yet the fuel still is fed to the combustion chambers at its most efficient pressure. Thus by an outside throttle and an inside valve, the operating handles for which may be placed side by side, the engine can be operated at all desired altitudes without loss of efficiency and any fuel can be used at all times at its maximum efficiency. Each of these adjustments is of great practical benefit in engines for airplanes or other flying machines. Even though the pressure in the compression reservoir might fall to atmospheric pressure, the continual operation of the engine will bring it to a maximum point at which it will remain constant which may be indicated by the formula $$P = p\left[\frac{B}{F} - 1\right]$$

in which P = pounds pressure in compression reservoir
B = total volume of all working chambers
F = volume of all working chambers up to cut-off, or total volume charged to give one explosion in each
p = pounds pressure of mixture or air sucked into chambers before compression as controlled by outside throttle.
Note: All working chambers perform alternately the functions of compression and combustion.

It is evident that the engine will run some time after the supply of fuel is cut off from the stored mixture in the compression tank. This feature may be developed to a sufficient extent to permit a landing to be made by an airplane when the fuel supply fails for any reason. It also may be adapted for starting the motor.

The engine may be air-cooled or water-cooled. The combustion chambers present a maximum of surface particularly adapted to air cooling as the outer wall will be cooled by the ordinary circulation of air around the engine. The inner wall of the engine formed by the periphery of the rotors, is cooled by air forced entirely through the engine by the blades of the wheels connecting the rotors to the shaft which, as stated above, may be shaped to form exhaust fans. The cooler and therefore heavier air will be thrown against the periphery of the rotors by centrifugal force, thereby forcing the heated air towards the center into the path of the exhaust fans and producing a secondary circulation to aid the first. The expelled heated air may be utilized for heating purposes, as for example, the fuselage of an airplane. If the engine should heat, a quantity of water thrown into the central opening will spread against the periphery of the rotors by centrifugal force, forming a water jacket, cooled on its inner surface by air circulation.

The main shaft may be a light steel tube with light bearings, as there is no strain thereon but a constant and perfectly balanced torque. Oil pipes to the different bearing points preferably lead to interior of the shaft so that oil forced into the shaft by any desired pressure means will be distributed to certain bearing points.

Many modifications of my invention will be apparent to those skilled in the art without departing therefrom or from the scope of my claims, my invention not being limited to the particular embodiment thereof chosen for purposes of illustration, but comprising an internal combustion engine having the objects pointed out above and such others as may flow from the construction described.

What I claim and desire to protect by Letters Patent is:

1. In a rotary internal combustion engine, a stator, a compression reservoir substantially in the center thereof, rotors within said stator on each side of said compression reservoir, and means to vary the exit opening from said reservoir to each of said rotors comprising valves and a common operating handle for said valves.

2. In a rotary internal combustion engine, a stator, a rotor within said stator, a working or combustion chamber between them, a compression reservoir made in two parts and having a port to the said chamber, means to vary the opening of said port comprising a valve, and means mounted on said stator to operate said valve.

3. In a rotary internal combustion engine, a non-circular stator, a circular rotor within said stator forming two chambers between said stator and said rotor, two blades in said rotor at approximately 180° apart and contacting with the surface of said stator, and means to perform in each chamber the four functions of intake, scavenging, compression, and explosion for every complete revolution of the blades.

4. In a rotary internal combustion engine, a non-circular stator, a circular rotor within said stator forming two chambers between said stator and said rotor, two blades in said rotor at approximately 180° apart and contacting with the surface of said stator, and means to perform in each chamber the four functions of intake, scavenging, compression, and explosion, said functions of intake and scavenging being performed at the same time and said functions of compression and explosion being performed at the same time.

5. In a rotary internal combustion engine, a stator, a rotor within said stator having a blade, a chamber between said rotor and said stator, a compression reservoir having ports, and means to force an explosive mixture by means of said rotor through one of said ports into said reservoir ahead of said rotor blade and at the same time drive said rotor by the explosion of an explosive mixture from said reservoir through another of said ports behind said rotor blade.

6. In a rotary internal combustion engine, a stator, a rotor within said stator having a blade, a chamber between said rotor and said stator, and means comprising said rotor to force exploded gases from said chamber ahead of said rotor blade and at the same time draw into said chamber a fresh explosive mixture behind said rotor blade for every complete revolution of the blades.

7. In a rotary internal combustion engine, a stator, a rotor within said stator, a chamber between said rotor and said stator, a compression reservoir, means on half a complete revolution of said rotor to force an explosive mixture by means of said rotor into said reservoir and at the same time drive said rotor by the explosion of an explosive mixture from said reservoir, and means on the other half of said revolution to force exploded gases by means of said rotor from said chambers to an exhaust and at the same time draw into said chambers a fresh explosive mixture.

8. In a rotary internal combustion engine, a stator, a rotor within said stator having a blade, a chamber between said rotor and said stator, a compression reservoir, means on half a complete revolution of said rotor to force an explosive mixture by means of said rotor into said reservoir ahead of said rotor blade and at the same time drive said rotor by the explosion of an explosive mixture from said reservoir behind said rotor blade, and means on the other half of said revolution to force exploded gases by means of said rotor from said chambers to an exhaust ahead of said blade and at the same time draw into said chambers a fresh explosive mixture behind said blade.

9. In an engine, means to utilize an expansive medium to perform work comprising a stator having an inlet, a rotor, a working chamber between the rotor and stator communicating with said stator inlet, a compression reservoir having an inlet and outlet communicating with said chamber, and means to vary the opening of said first mentioned inlet.

10. In an engine, means to utilize an expansive medium to perform work comprising a stator having an inlet, a rotor, a working chamber between it and the stator communicating with said stator inlet, a fuel compression reservoir having an inlet and outlet communicating with said chamber and means to vary the opening of said outlet.

11. In a rotary internal combustion engine, a non-circular stator, a circular rotor within said stator forming a chamber between said stator and rotor, a fuel inlet through said rotor to said chamber, a compression reservoir, means to force the fuel from said chamber to said reservoir, and means to vary the size of said inlet.

12. In a rotary internal combustion engine, a non-circular stator, a circular rotor within said stator forming a chamber between said stator and rotor, means to convey fuel to said chamber, a compression reservoir, means to force fuel from said chamber into said reservoir, and means to permit fuel to leave said reservoir to form a working charge in said chamber.

13. In a rotary internal combustion engine, a non-circular stator, a circular rotor within said stator forming a chamber between said stator and rotor, means to convey fuel to said chamber, a compression reservoir, means to force fuel from said chamber into said reservoir, means to permit fuel to leave said reservoir to form a working charge in said chamber, and means to control the amount of fuel leaving said reservoir.

14. In a rotary internal combustion engine, a non-circular stator, a circular rotor within said stator forming a chamber between said stator and rotor, a fuel inlet through said rotor to said chamber, a compression reservoir, means to force the fuel from said chamber into said reservoir, means to permit fuel to leave said reservoir to form a working charge in said chamber, means to control the size of said fuel inlet, and means to control the amount of fuel leaving said reservoir.

In testimony that I claim the foregoing, I have hereunto set my hand this 26th day of April, 1920.

VAN ZO POST.